United States Patent [19]

Mair

[11] Patent Number: 4,557,909
[45] Date of Patent: Dec. 10, 1985

[54] METHOD TO IMPROVE ACIDULATION QUALITY OF NORTH CAROLINA PHOSPHATE ROCK

[75] Inventor: Alexander D. Mair, Florence, Ala.

[73] Assignee: Tennessee Valley Authority, Muscle Shoals, Ala.

[21] Appl. No.: 681,157

[22] Filed: Dec. 13, 1984

Related U.S. Application Data

[63] Continuation of Ser. No. 649,034, Sep. 10, 1984, abandoned.

[51] Int. Cl.$^4$ ............................................. C01B 25/16
[52] U.S. Cl. ..................................................... 423/167
[58] Field of Search ......................................... 423/167

[56] References Cited

U.S. PATENT DOCUMENTS

| | | | |
|---|---|---|---|
| 3,995,987 | 12/1976 | MacAskill | 34/10 |
| 4,017,585 | 4/1977 | Angevine et al. | 423/167 |
| 4,321,238 | 3/1982 | Henin | 423/167 |
| 4,325,928 | 4/1982 | Lowe | 423/320 |
| 4,389,380 | 6/1983 | Parks | 423/167 |

FOREIGN PATENT DOCUMENTS 761721 7/1971 Belgium ............................. 423/167

*Primary Examiner*—John Doll
*Assistant Examiner*—Wayne A. Langel
*Attorney, Agent, or Firm*—Robert A. Petrusek

[57] ABSTRACT

Phosphate rock is heated under controlled conditions to essentially eliminate organic impurities and sulfides from the rock and subsequently leached with water to substantially increase the porosity and surface area of the calcined solid and remove any traces of sulfide still remaining in the calcine. This process yields an improved calcined product rendered more suitable for acidulation to wet-process phosphoric acid and is beneficial for apatitic phosphate rocks possessing a moderate to high content of organic impurities and a high degree of carbonate substitution in the apatite crystal lattice.

3 Claims, No Drawings

METHOD TO IMPROVE ACIDULATION QUALITY OF NORTH CAROLINA PHOSPHATE ROCK

The invention herein described may be manufactured by or for the Government for governmental purposes without the payment to me of any royalty therefor.

This is a continuation of Application Ser. No. 649,034, filed Sept. 10, 1984, surrendered to the Defensive Publication Program Dec. 11, 1984, abandonded, for METHOD TO IMPROVE ACIDULATION QUALITY OF NORTH CAROLINA PHOSPHATE ROCK, Alexander D. Mair.

INTRODUCTION

The present invention relates to methods and processes for the calcination and leaching of phosphate ores. More particularly, the present invention relates to the calcination and subsequent leaching of phosphate rock to remove therefrom organic impurities, to eliminate therefrom undesirable sulfide formation, and maintain therein adequate reactivity in the rock.

BACKGROUND OF THE INVENTION

1. Field of the Invention

Deposits of marine sedimentary fluorapatites are the world's main source of phosphate reserves and resources. As originally laid down on the seabed, this phosphate mineral material is not considered to be simply fluorapatite, $Ca_5(PO_4)_3F$, in composition, but rather highly substituted variants of this formula. Thus, it has commonly been found that large amounts of carbonate and lesser amounts of sulfate substitute in the fluorapatite formula for the phosphate and sodium and magnesium ions substitute for the calcium ion. Many substitutions by other elements may also occur, but usually to a lesser extent. Such substituted sedimentary phosphates are known as francolites.

Considerable organic matter was incorporated into these francolite deposits as they were formed on the seabed. Over subsequent geological time, many of these francolite deposits, wholly or at least in part, have become weathered, reworked, or metamorphosed, leading to loss of the organic impurities and other accessory minerals and to changes in the francolite mineral composition towards a less substituted fluorapatite more closely approximating the formula for pure fluorapatite, all such factors leading to a highly desirable enrichment in phosphate content and at least partial removal of undesirable impurities. Commercially exploited phosphate rock deposits representative of such francolite ores are the reworked Bone Valley Formation in Florida, the residual phosphate deposits of Tennessee, and the surficial, more altered and weathered, portions of the Phosphoria Formation in southeast Idaho and surrounding states.

However, the phosphate rock in several deposits which have become commercially viable remains substantially in an unaltered state, with moderate to large amounts of organic matter (organic carbon content of the ore at least 0.5 percent) still present. In such deposits which have not been subject to deep burial during geological time, the francolite mineral retains a high degree of substitution within its crystal lattice by carbonate, sulfate, sodium, etc. Representative of such deposits is the Pungo River Formation of North Carolina.

In contrast to deposits of the North Carolina type, other unweathered deposits have been deeply buried at some stage for long periods of geological time, and the much lower degree of substitution by carbonate found in the structure of such francolites is considered to be caused by burial metamorphism. This process would alter the highly substituted francolite originally deposited to the less substituted, less reactive, and more thermally stable francolite which is present in the deposit today. Representative of this ore type are the unaltered and more deeply buried portions of the Meade Peak member of the Phosphoria Formation, centered in southeast Idaho.

When unweathered rock from both types of deposits discussed above is used in practicing the wet process for effecting the manufacture of phosphoric acid, in which the rock is reacted with a mixture of phosphoric and sulfuric acids followed by filtration of the calcium sulfate formed in the acidulation step to produce a filtrate of phosphoric acid, it has been found that presence of the organic material in the ore causes undesirable foaming and can severely hinder filtration of the byproduct calcium sulfate from the product acid. In order to improve the quality of such rock prior to acidulation, phosphate rocks of both the North Carolina and Idaho types are now generally calcined at a temperature of about 800° C. in a fluidized bed furnace or a rotary kiln to decompose and remove the organic matter.

Incomplete removal of the organic matter during calcination may still cause foaming and filtration problems when the calcine is acidulated in the wet-process phosphoric acid process. In addition, the calcination process unfortunately may increase the sulfide content of the rock. Sulfide in the calcined rock is generally regarded as exacerbating existing filtration problems and of causing marked increases in equipment corrosion when processing rock to wet-process acid.

Particularly objectionable is formation during calcination of what shall, for the sake of convenience, be hereinafter referred to and termed "acid-evolved sulfide," the sulfide which is evolved as a noxious gas such as hydrogen sulfide during acidulation of the rock. In addition to its suspected role in increasing equipment corrosion, acid-evolved sulfide, as a precursor of such toxic fumes, is a potential health and environmental hazard. Acid-evolved sulfide can originate from many sources, usually after reaction of the source material during thermal treatment of the phosphate rock. Sources include sulfur contained in gangue minerals, such as gypsum or pyrite, sulfur exsolved from the francolite crystal lattice during heating of the rock, elemental sulfur impurities, the generally high sulfur content of the organic matter associated with phosphate rock, and sulfur derived from the fuel used in the thermal treatment.

I have found for both the Idaho and North Carolina types of phosphate rock that virtually all the organic impurity and the acid-evolved sulfide content can be eliminated by carefully controlled heating at temperatures of 800° C. or greater for a sufficient period of time in an atmosphere containing excess oxygen. With this procedure, the calcine from Idaho rock still maintains a product of adequate surface area and reactivity for subsequent acidulation processes in manufacturing phosphoric acid or superphosphate. A level of reactivity in the calcine regarded as acceptable to industry corresponds to a surface area in the calcine of at least 2 $m^2/g$.

However, when North Carolina rock is calcined under these conditions to eliminate the organic impurity and sulfides, it has been found that the practice, unfortunately, results in a calcined product exhibiting undesirably low surface area (usually about 0.2 m$^2$/g), leading to poor reactivity of the rock when acidulated and consequent increased loss of phosphate to the by-product calcium sulfate filter cake when manufacturing wet-process acid. The differences found in the surface area and reactivity of the North Carolina and Idaho calcines lies in the nature of the francolite mineral in the rocks and their different stabilities towards treatment by heat. Thus, the highly substituted francolite mineral found in North Carolina and similar phosphate rocks is more thermally unstable than the less highly substituted francolite mineral in the Idaho rock, and in contrast to the latter, shows appreciable structural collapse and resultant loss of surface area and reactivity when heated to about 800° C.

It is thus apparent that a need exists for an improved thermal or calcination process for phosphate rocks in which the predominant phosphate mineral is a highly substituted and thus less thermally stable francolite. More specifically, a need exists for a thermal or calcination process for North Carolina phosphate rock where levels of acid-evolved sulfide and residual organic matter in the calcined rock can be minimized but where the surface area of the calcined phosphate can advantageously be maintained at levels greater thant 2 m$^2$/g to effect a calcined rock possessing improved and sufficient reactivity to acid attack in the wet process for manufacturing phosphoric acid.

2. Description of the Prior Art

The prior art shows that an attempt has been made to develop such a process for North Carolina phosphate rock. In U.S. Pat. No. 4,348,380, Kenneth L. Parks, a process is disclosed wherein the North Carolina rock is calcined in two stages to retain adequate surface area in the calcine while attempting to minimize residual organic carbon and sulfide levels. Although improvement over a single-stage process was demonstrated, it is apparent from the examples given therein that appreciable amounts of organic carbon and sulfide remained in the calcine under conditions necessary in his two-stage process to yield a calcine of adequate surface area. Thus, in an illustration given of that process wherein a one-hour treatment at 635° C. was followed by a second calcination treatment for 30 minutes at 702° C., the calcined product possessed an adequate surface area of 2.2 m$^2$/g, but still contained substantial levels of organic carbon (0.07 percent) and sulfide (0.10 percent). A further drawback of the process is the economic penalty incurred by the requirement that the rock be twice heated to relatively high temperatures.

An approach to phosphate rock beneficiation which has been used for phosphate rocks containing high concentrations of calcite, for example, as described in British Pat. No. 731,999, S. Davidson, June 15, 1955, and No. 1,045,607, E. R. Herman, Oct. 12, 1966, and by A. Talmi et al in *Bull. Res. Council of Israel*, Vol. 10C, pp. 144–158 (1962), and P. C. Good in U.S. Bureau of Mines Report of Investigation RI 8154 (1976), entails heating the rock at high temperatures wherein the calcite decomposes to lime, i.e., at least 850° C. and usually 900°–1050° C. and subsequently removing the lime by either wet- or dry-slaking processes. Inasmuch as North Carolina feed-grade phosphate rock consists of the aforementioned carbonate-substituted apatite and contains negligible free carbonate accessory minerals, such a process is not of obvious benefit and has not been previously considered for North Carolina phosphate rock. Indeed, at the high temperatures shown by the prior art to be necessary for calcite or calcium carbonate decomposition to CaO, I have found that the surface area, and thus the reactivity, of North Carolina rock calcined at such temperatures is unacceptably low even after treatment with water. None of these previous calcination-slaking processes has addressed the serious problems of residual organic matter, acid-evolved sulfide generation, or loss of rock reactivity which are encountered with calcination of North Carolina rock and similar types of phosphate ores. Therefore, it is evident that the need remains for an improved process which will produce an acceptable calcined product from North Carolina phosphate rock.

SUMMARY OF THE INVENTION

According to the teachings of the present invention, a high quality calcined product suitable for wet-process phosphoric acid manufacture is produced from North Carolina phosphate rock by calcining such rock, usually in the form of a beneficiated grade produced by flotation pretreatment, under precisely controlled conditions at a temperature of about 800° C. and by subsequently leaching the calcine in water or an aqueous solution.

OBJECTS OF THE INVENTION

In view of the foregoing, it is therefore an objective of the present invention to provide an improved process for producing a calcined product from North Carolina and similar phosphate rocks containing highly substituted francolites as the predominant source of phosphate as well as carbonate in the ore.

It is a further object of the present invention to provide a process for North Carolina phosphate rock where sufficient surface area and reactivity are maintained in the calcined product for satisfactory acidulation in wet-process phosphoric acid processes.

Another object of the present invention is to provide a process where the undesirable organic impurities present in the North Carolina phosphate rock are eliminated.

A still further object of the present invention is to provide a calcination process for North Carolina phosphate rock to minimize and ideally prevent formation in the calcined product of undesirable and corrosive sulfides and precusors of noxious and toxic gases such as hydrogen sulfide which are liberated during wet-process acidulation of the calcine.

Still another object of the present invention is to provide an improved and economical method for processing North Carolina phosphate rock where existing calcination facilities may be incorporated in this new process.

Still further and more general objects and advantages of the present invention will appear from the more detailed description set forth below, it being understood, however, that this more detailed description is given by way of illustration and explanation only and not necessarily by way of limitation since various changes therein may be made by those skilled in the art without departing from the true spirit and scope of the present invention.

DESCRIPTION OF THE PREFERRED EMBODIMENTS

In the preferred embodiment of the present invention, the calcination process is carried out at a temperature in the range of from about 770° C. to about 840° C., and preferably at about 790°–820° C., and most preferably at about 800° C. The furnace used in the calcination process is preferably of the fluidized bed or rotary kiln type and most preferably a fluidized bed reactor. The thermal treatment is carried out in an atmosphere of excess oxygen supplied by air. The duration of the heating time at the preferred temperature is from about 15 minutes to about 120 minutes, preferably from about 30 to 90 minutes and most preferably from about 50 minutes to about 70 minutes. A combination of calcination temperature and residence time are selected to provide the highest surface area to the calcine after the leaching step while also providing the desired low or negligible levels of residual organic carbon and acid-evolved sulfide in the calcined product.

The subsequent leaching of the calcined rock in the preferred embodiment uses as the leachate water or aqueous salt solutions such as seawater or the gypsum pond water derived as a waste byproduct of wet-process phosphoric acid manufacture. In particular, it may be advantageous to incorporate the use of seawater or gypsum pond waters into the leaching circuit where rock beneficiation plants are located in the vicinity of the ocean or situated close to a wet-process phosphoric acid manufacturing facilities, respectively. As understood by those skilled in the art, these and other salt solutions such as recycled leachate, together with substantially pure water, may be used separately or mixed in various proportions to form leaching media of compositions found economically and technically desirable. As also understood by those skilled in the art, the leaching of the calcine may be applied as a multi-stage process with the number, sequence, and nature of the leaching stages such as to be most economically and technically advantageous.

In the preferred embodiment of the instant invention, North Carolina phosphate rock is heated to sufficiently high temperatures to volatilize essentially all of the congeneric organic matter and to minimize undesirable sulfide formation. Laboratory tests show that if lower temperatures than those specified herein are used as, for example, at between about 700° C. to about 770° C., a carbonaceous char resistant to gasification forms. This char can be removed only by heating at higher temperatures. In this temperature range of 700°–770° C., formation of the undesirable acid evolved sulfide is at a maximum, and complete elimination of this sulfide during the calcination step is only possible if calcination is carried out at temperatures of greater than 800° C.

If the calcination temperature is too high as with, for example, temperatures of 850° C. or greater, complete elimination of the organic matter may not occur, since the sudden collapse of the francolite structure during calcination with resultant melting in the rock particles may effectively encapsulate and immobilize a portion of the organic matter therein. As discussed previously, heating at these high temperatures also causes a marked and detrimental drop in surface area in the calcine to about 0.2 $m^2/g$ and consequent loss in reactivity on subsequent acidulation of the calcined product.

In the preferred embodiment of this invention, the heat treatment applied to the particular phosphate type rock herein concerned with is such that the highly substituted francolite mineral which is the predominant source of phosphate in North Carolina ores is only partially decomposed and consequently only partially converted to a less substituted and less reactive form of fluorapatite. My laboratory tests show that molten material in the rock particles which results from this partial thermal decomposition of the francolite occurring in the preferred embodiment, and which is at least partially responsible for the unacceptably low surface area in the unleached calcine, is predominately of a sodium sulfate composition. This molten material, which solidifies on cooling the calcine, derives from the sodium and sulfate exsolved from the crystal lattice of the thermally decomposing francolite mineral. The resultant melt apparently blocks the fine pore structure of the phosphate particles. Acidulation of the calcine in the wet process may cause a rapid exchange of Ca ions from the attacking acid solution for the sodium ions in this solidified molten material, converting the latter to an undesirable deposit of insoluble calcium sulfate in the pores and on the surfaces of the phosphate particles. Advantageously, soluble components such as this sodium sulfate material are removed from the calcine by leaching with water, providing a consequent and desirable decrease in pore blockage and increase in surface area for the calcined product.

In the preferred embodiment of this invention, sufficient quantities of the water-soluble components such as the sodium sulfate material are removed from the pores of the phosphate particles in the leaching step to effect approximately a twenty (20) fold increase in surface area over the corresponding unleached calcine, enhancing the surface area to a level of at least 2 $m^2/g$, specified earlier as a level regarded in the phosphoric acid industry as adequate and sufficient for good acidulation behavior. Under heating conditions more severe than those specified in the preferred embodiment of the instant invention, an adequate surface area and reactivity in the calcine cannot be achieved, even after the leaching step. Such undesirable heating conditions include those sufficiently severe to substantially decompose rhombic carbonates such as calcite, which are often present in phosphate rock as accessory minerals. Undesirably severe heating conditions for North Carolina rock cause essentially complete decomposition of the francolite mineral contained therein, producing as a consequence a recrystallized and more coarsely crystalline fluorapatite of low surface area and reactivity; other products such as the components exsolved from the crystal lattice of the decomposed francolite, such as sodium, sulfate, calcium, and fluoride, further react among themselves and with accessory minerals in the calcine such as quartz to form undesirable water-insoluble and less leachable substances blocking the pores of the calcined particles.

Another advantageous aspect of the present invention provides enhanced removal of undesirable acid-evolved sulfides formed in the heating stage by the subsequent leaching treatment. In the preferred embodiment hereof, trace amounts of acid-evolved sulfide formed during the heat treatment are reduced to negligible amounts after leaching the calcine with water or aqueous solutions. At lower and higher calcination temperatures than those specified as necessary to the teachings for practice of the preferred embodiment of the present invention, essentially all or most of the acid-evolved sulfide remains water insoluble and unfortunately cannot be removed in the water-leaching step. It is presumed that most sulfide is present in the calcine as water-insoluble compounds such as CaS, but in the calcination temperature range specified herein, an appreciable proportion of any acid-evolved sulfide present is beneficially in a water-soluble form, such as the highly water-soluble compound, $Na_2S$, and readily removed by water leaching.

A further advantage of the present invention which will be appreciated by those skilled in the art permits the incorporation of existing calcination facilities into the present invention with only minor modifications in procedure and equipment, thus decreasing capital costs for the practice thereof. This benefit arises from the fact that the commercial calcination process, as presently practiced for North Carolina rock, is operated in approximately the temperature range found desirable for the calcination step of the new invention.

Those skilled in the art will appreciate that the process of the present invention will not be restricted to the use of the phosphate rock from North Carolina, but will also be beneficial for phosphate rock from other deposits containing undesirable levels of organic matter wherein the predominant source of the phosphate is a highly substituted francolite mineral with a carbon dioxide content contained within the francolite crystal lattice of at least 4 percent by weight of pure francolite mineral. Other such phosphate rocks suitable for the method of the present invention include, but are not limited to, those from Gafsa, Tunisia, and from that portion of the Hawthorne Formation in Florida which is most deeply buried and unweathered.

It will also be appreciated by those skilled in the art that selection of processing conditions will depend on the nature of the material to be calcined, the design of the calcination and leaching equipment, the nature of the calcination and leaching methods employed and the desired characteristics of the calcined product.

In order that those skilled in the art may better understand how the present invention can be practiced and more fully and definitely understood, the following examples are given by way of illustration and not necessarily by way of limitation.

EXAMPLES

Table I infra shows the chemical and particle-size distribution of a typical North Carolina phosphate rock concentrate, beneficiated by a double-flotation process and used in the following examples.

TABLE I

Analyses of North Carolina Phosphate Rock

| | Weight, % | Particle diameter (micrometers) | Weight, % |
|---|---|---|---|
| $P_2O_5$ | 30.3 | Greater than 1700 | 0.1 |
| CaO | 49.1 | 1180–1700 | 0.1 |
| MgO | 0.5 | 850–1180 | 0.5 |
| $Na_2O$ | 0.9 | 600–850 | 1.4 |
| $K_2O$ | 0.1 | 425–600 | 4.9 |
| $Al_2O_3$ | 0.5 | 300–425 | 16.9 |
| $Fe_2O_3$ | 0.7 | 212–300 | 36.8 |
| $SiO_2$ | 2.6 | 150–212 | 26.8 |
| F | 3.7 | 106–150 | 11.2 |
| S (total) | 1.1 | 75–106 | 1.2 |
| S (sulfate) | 0.7 | Less than 75 | 0.1 |
| $CO_2$ | 5.9 | | |
| Organic C | 1.25 | | |

Table II infra shows pertinent analytical data for examples wherein the rock as shown in Table I, supra, was calcined in air in a muffle furnace at various temperatures for heating periods of 15, 30, and 60 minutes, together with similar data for the uncalcined rock. Data shown include the residual levels of the organic matter and acid-evolved sulfide and the surface area of the cooled calcine. The examples given in Table II infra demonstrate that heating at 1000° C. for at least 30 minutes or at 800° or 900° C. for at least 60 minutes is required to eliminate essentially all of the residual organic matter and the deleterious acid-evolved sulfide. In examples where the sample was heated for shorter times at these temperatures, and in every example calcined at 700° C., high and unacceptable levels of the residual organic carbon and of the acid-evolved sulfide were found. As also demonstrated in Table II, all heating conditions found to provide acceptably low levels of organic carbon and acid-evolved sulfide in the calcine also gave to the calcined product a drastically and unacceptably lower surface area (0.2 $m^2/g$, or less) and consequently an undesirably low reactivity toward acid attack. For this North Carolina phosphate rock, it was found that heating either in a fluidized bed reactor or a muffle furnace gave calcines of comparable quality.

TABLE II

Effect of Calcination Conditions on the Properties of Calcined Rock Not Subject to a Subsequent Water-Leaching Process

| Calcination conditions | | Calcine Properties | | |
|---|---|---|---|---|
| Temperature (°C.) | Residence time (min) | Surface area ($m^2/g$) | Acid evolved sulfide (%) | Organic Carbon (%) |
| Uncalcined | | 18 | 0.01 | 1.25 |
| 700 | 15 | 3.6 | 0.31 | 0.7 |
| 700 | 30 | 1.0 | 0.55 | 0.4 |
| 700 | 60 | 0.5 | 0.45 | 0.4 |
| 800 | 15 | 0.2 | 0.57 | 0.2 |
| 800 | 30 | 0.2 | 0.27 | 0.08 |
| 800 | 60 | 0.2 | 0.02 | 0.02 |
| 900 | 15 | 0.1 | 0.45 | 0.1 |
| 900 | 30 | 0.2 | 0.11 | 0.07 |
| 900 | 60 | 0.2 | <0.01 | 0.03 |
| 1000 | 15 | 0.2 | 0.49 | 0.06 |
| 1000 | 30 | 0.2 | <0.01 | 0.05 |
| 1000 | 60 | 0.2 | <0.01 | 0.03 |

Analytical data for examples of North Carolina phosphate rock subjected to the same thermal treatment as shown in Table II, supra, but with the addition of a single-stage water-leaching step of 120 minutes' duration subsequent to the thermal treatment are shown in Table III, infra. Additional examples obtained by heating at 750° C. are also shown. Residual organic carbon contents of these leached calcines were unchanged from that level found in the corresponding unleached calcine shown in Table II, supra. Acid-evolved sulfide levels for the leached calcines, as shown in Table III, infra, are also similar to, or slightly lower than (e.g., at 700° C.), levels in the comparable unleached calcine (Table II) except for those examples calcined at 800° C., demonstrating that, after a sufficient heating time, a major portion of the acid-evolved sulfide remaining after the heat treatment at, and only at, about 800° C. can beneficially be removed in the leaching step.

TABLE III

Effect of Calcination Conditions on the Properties of Calcined Rock After a Subsequent Water-Leaching Process

| Calcination conditions | | Properties of leached calcine | | | |
|---|---|---|---|---|---|
| Temp. (°C.) | Residence time, (min) | Surface area ($m^2/g$) | Acid-evolved sulfide (%) | $Na_2O$ (%) | $CO_2$ (%) |
| Uncalcined/leached | | 16.9 | 0.01 | 1.04 | 5.6 |
| 700 | 15 | 2.7 | 0.25 | 1.05 | 4.8 |
| 700 | 30 | 1.2 | 0.50 | 1.08 | 4.5 |
| 700 | 60 | 1.1 | 0.41 | 1.04 | 4.2 |
| 750 | 15 | 0.7 | 0.51 | 1.06 | 4.6 |
| 750 | 30 | 1.1 | 0.28 | 0.92 | 3.8 |
| 750 | 60 | 1.8 | 0.10 | 0.80 | 2.8 |
| 800 | 15 | 0.7 | 0.49 | 0.93 | 4.2 |
| 800 | 30 | 1.6 | 0.15 | 0.70 | 2.6 |
| 800 | 60 | 3.7 | <0.01 | 0.58 | 1.7 |
| 900 | 15 | 1.0 | 0.44 | 0.76 | 2.2 |
| 900 | 30 | 1.6 | 0.13 | 0.47 | 1.3 |
| 900 | 60 | 1.8 | <0.01 | 0.37 | 0.9 |
| 1000 | 15 | 0.8 | 0.53 | 0.77 | 1.2 |
| 1000 | 30 | 1.3 | <0.01 | 0.40 | 0.6 |
| 1000 | 60 | 1.2 | — | 0.29 | 0.5 |

Marked improvements were found for levels of the surface area in the leached calcines when compared to the unleached calcine subject to the same thermal treatment. However, as demonstrated in Table III, supra, only one example gave an acceptable surface area of greater than 2 $m^2/g$, coupled with the desired essentially complete elimination of residual organic carbon and acid-evolved sulfide. This example wherein the phosphate rock was heated at 800° C. for 60 minutes prior to water leaching, provided a relatively high surface area of 3.7 $m^2/g$, a nearly twenty (20) fold increase over the level in the calcine with no such leaching treatment, and very low levels of both residual organic carbon (0.02 percent) and acid-evolved sulfide (0.01 percent). This negligible sulfide level had been further reduced from the already low level of 0.02 percent in the calcine prior to water leaching. Microscopic examination of the calcine from this example representing perhaps the most preferred embodiment of the present invention illustrated that no apparent decrease in particle size and no apparent particle disintegration or spallation had occurred in either the calcination or leaching steps.

The examples shown in Table III, supra, also demonstrate that carbon dioxide loss from the calcine and $Na_2O$ removal by leaching increase with the severity of the heat treatment. The data for the example representing the preferred heat treatment of 800° C. for a duration of 60 minutes demonstrate that, after correcting for the weight lost from the sample during calcination, a substantial amount, 50 percent exactly, of the $Na_2O$ present in the original uncalcined rock had been removed after the subsequent water leach, and that the francolite mineral in the sample had advantageously not been completely decomposed by the heat treatment, to wit, 27 percent of the carbon dioxide from the original uncalcined rock remaining in the leached calcine.

For the preferred heat treatment of 800° C. for 60 minutes, a further advantage is gained in that the $P_2O_5$ content of the original rock product has been appreciably upgraded from a level of 30.3 to 33.5 percent on a dry basis after the calcination and leaching treatment.

INVENTION PARAMETERS

After sifting and winnowing through the data supra, as well as other results and operation of my new, novel, and improved method for processing North Carolina phosphate rock, I now present the acceptable and preferred parameters and variables as shown below.

| Calcination conditions | Operating range | Preferred (about) | Most Preferred (about) |
|---|---|---|---|
| Temperature (°C.) | 770–840 | 790–820 | 800 |
| Retention time (min) | 15–120 | 30–90 | 50–70 |
| Product after calcination and leaching | | | |
| Surface area ($m^2/g$) | 1.6–7 | >2 | >3.5 |
| Acid-evolved sulfide (%) | 0–0.05 | <0.02 | <0.01 |
| Residual organic carbon (%) | 0–0.1 | <0.05 | <0.03 |

While I have shown and described particular embodiments of my invention, modifications and variations thereof will occur to those skilled in the art. I wish it to be understood, therefore, that the appended claims are intended to cover such modifications and variations which are within the true scope and spirit of my invention.

What I claim as new and desire to secure by Letters Patent of the United States is:

1. An improved process for single-stage calcining organic matter contaminated phosphatic apatite rock of the mineral class generally known as francolites and of the subclass generally known as unaltered francolites, said unaltered francolites characterized by retaining a high degree of substitution in the crystal lattice thereof of materials selected from the group comprising ions of carbonate, sodium, sulfate, and mixtures thereof, said improved process consisting of:
   (1) thermally treating said rock within the temperature range of about 790° C. to about 820° C. for a period of time ranging from about 30 to about 90 minutes,
   (2) subsequently removing at least a substantial portion of the species in said rock effected water-soluble by said thermal treatment in (1) supra, including sodium and sulfate ions and traces of residual sulfides by leaching same, for a predetermined time sufficient to effect said removal, with aqueous media, said aqueous media selected from the group consisting of substantially pure water, salt solutions, seawater, gypsum pond water derived from wet-process phosphoric acid manufacture, and mixtures thereof, and
   (3) recovering as product from the process the resulting calcined and leached intermediate product in a form eminently suitable for the subsequent acidulation thereof to phosphoric acid, said process characterized by the fact that said calcining of said organic matter contaminated phosphatic apatite rock is effected in such a manner so as to produce therefrom a resulting calcined phosphate rock product having substantially all of the congeneric organic matter eliminated therefrom, having acid evolved sulfide formation therefrom substantially minimized, having decomposition of said francolite mineral to a less highly substituted fluorapatite substantially minimized with substantial amounts of the associated carbonate which is originally structurally incorporated within the crystal lattice of said francolite mineral being retained therein, and effecting in said leaching treatment in step (2) supra subsequent to the calcining in step (1) supra a substantial enhancement of the porosity thereof to thereby effect a surface area of at least 2 m²/g.

2. The process of claim 1 wherein said rock is heated during the calcining thereof to a temperature of about 800° C. for a period of time ranging from about 50 to about 70 minutes.

3. The process of claim 1 wherein said rock originates in the geological entity generally described as the Pungo River Formation, as found in North Carolina.

* * * * *

UNITED STATES PATENT AND TRADEMARK OFFICE
CERTIFICATE OF CORRECTION

PATENT NO. : 4,557,909
DATED : December 10, 1985
INVENTOR(S) : Alexander D. Mair It is certified that error appears in the above-identified patent and that said Letters Patent is hereby corrected as shown below:

Column 3, line 36, change "4,348,380" to -- 4,389,380 --

Column 5, line 30, before "wet-process" delete -- a --

Column 9, Lines 35-36, change "0.01 percent" to -- "<0.01 percent" --

Signed and Sealed this

Fifteenth Day of April 1986

[SEAL]

Attest:

DONALD J. QUIGG

Attesting Officer     Commissioner of Patents and Trademarks